US012159544B2

(12) United States Patent
Ince et al.

(10) Patent No.: US 12,159,544 B2
(45) Date of Patent: Dec. 3, 2024

(54) SUGGESTED GATE PUSHBACK TIME

(71) Applicant: American Airlines, Inc., Fort Worth, TX (US)

(72) Inventors: Ilhan Ince, Baltimore, MD (US); Lourdmareddy Gumireddy, Sewickley, PA (US); Hakan Ergan, Pittsburgh, PA (US); Bo Zhang, Bridgeville, PA (US)

(73) Assignee: American Airlines, Inc., Fort Worth, TX (US)

( * ) Notice: Subject to any disclaimer, the term of this patent is extended or adjusted under 35 U.S.C. 154(b) by 274 days.

(21) Appl. No.: 17/488,013

(22) Filed: Sep. 28, 2021

(65) Prior Publication Data

US 2022/0020278 A1 Jan. 20, 2022

Related U.S. Application Data

(63) Continuation of application No. 16/242,211, filed on Jan. 8, 2019, now Pat. No. 11,132,908, which is a continuation of application No. 15/228,184, filed on Aug. 4, 2016, now Pat. No. 10,210,766, which is a continuation of application No. 13/833,761, filed on Mar. 15, 2013, now Pat. No. 9,437,114.

(51) Int. Cl.

| | |
|---|---|
| ***G05G 5/00*** | (2006.01) |
| ***G08G 5/00*** | (2006.01) |
| ***G08G 5/06*** | (2006.01) |

(52) U.S. Cl.

CPC ......... *G08G 5/0065* (2013.01); *G08G 5/0034* (2013.01); *G08G 5/0039* (2013.01); *G08G 5/0043* (2013.01); *G08G 5/0082* (2013.01); *G08G 5/065* (2013.01)

(58) Field of Classification Search

CPC ...... G08G 5/0065; G08G 5/0043; G08G 5/06; G08G 5/0082; G08G 5/065; G08G 5/0034; G08G 5/0039; G06Q 10/04

See application file for complete search history.

(56) References Cited

U.S. PATENT DOCUMENTS

| | | | | |
|---|---|---|---|---|
| 5,519,618 A | 5/1996 | Kastner | | |
| 6,278,965 B1 | 8/2001 | Glass et al. | | |
| 2011/0282565 A1* | 11/2011 | Law | G08G 5/065 | 701/117 |

(Continued)

OTHER PUBLICATIONS

USPTO, Restriction/Election Requirement dated Jan. 2, 2015 in U.S. Appl. No. 13/833,761.

(Continued)

*Primary Examiner* — Nga X Nguyen

(74) *Attorney, Agent, or Firm* — SNELL & WILMER L.L.P.

(57) ABSTRACT

A departure sequencing system models airport operations and provides suggested gate pushback times for aircraft. In various embodiments, a departure sequencing system includes an airport state analyzer, a taxi-out predictor, and a pushback optimizer. The departure sequencing system may utilize stochastic models, and resolve aircraft conflicts using a business rules engine. Via use of the departure sequencing system, taxi times may be reduced, taxi fuel burn may be reduced, and airport throughput may be increased.

20 Claims, 8 Drawing Sheets

(56) References Cited

U.S. PATENT DOCUMENTS

| | | | | |
|---|---|---|---|---|
| 2012/0173131 | A1* | 7/2012 | Brennan | G08G 5/0043 701/120 |
| 2012/0221233 | A1* | 8/2012 | White | G08G 5/0039 701/120 |
| 2012/0245836 | A1* | 9/2012 | White | G08G 5/06 701/120 |
| 2012/0254084 | A1 | 10/2012 | Richter et al. | |
| 2014/0077975 | A1 | 3/2014 | Khatwa et al. | |

OTHER PUBLICATIONS

USPTO, Non-Final Office Action dated Mar. 23, 2015 in U.S. Appl. No. 13/833,761.

USPTO, Final Office Action dated Aug. 10, 2015 in U.S. Appl. No. 13/833,761.

USPTO, Advisory Action dated Oct. 22, 2015 in U.S. Appl. No. 13/833,761.

USPTO, Non-Final Office Action dated Dec. 3, 2015 in U.S. Appl. No. 13/833,761.

USPTO, Notice of Allowance dated May 13, 2016 in U.S. Appl. No. 13/833,761.

Hamsa, "A Framework for Coordinated Surface Operation Planning at Dallas-Fort Worth International Airport," 2007, American Institute of Aeronautics and Astronautics, pp. 1-19.

Peterson, The Problem with Airlines and Checked Baggage, Jun. 18, 2012, Conde Nast Traveler, pp. 1-10.

USPTO, Non-Final Office Action dated Feb. 7, 2018 in U.S. Appl. No. 15/228,184.

USPTO, Final Office Action dated Jun. 7, 2018 in U.S. Appl. No. 15/228,184.

USPTO, Advisory Action dated Aug. 6, 2018 in U.S. Appl. No. 15/228,184.

USPTO, Non-Final Office Action dated Sep. 7, 2018 in U.S. Appl. No. 15/228,184.

USPTO, Notice of Allowance dated Dec. 20, 2018 in U.S. Appl. No. 15/228,184.

USPTO, Non-Final Office Action dated Feb. 1, 2021 in U.S. Appl. No. 16/242,211.

USPTO, Final Office Action dated Apr. 9, 2021 in U.S. Appl. No. 16/242,211.

USPTO, Advisory Action dated May 17, 2021 in U.S. Appl. No. 16/242,211.

USPTO, Notice of Allowance dated Jun. 1, 2021 in U.S. Appl. No. 16/242,211.

* cited by examiner

SUGGESTED GATE PUSHBACK TIME

CROSS-REFERENCE TO RELATED APPLICATIONS

This application is a continuation of, claims priority to and the benefit of, U.S. Ser. No. 16/242,211 filed on Jan. 8, 2019, entitled "USING A GRAPH NETWORK MODEL TO DETERMINE A GATE PUSHBACK TIME." The '211 application is a continuation of, claims priority to and the benefit of, U.S. Ser. No. 15/228,184 filed on Aug. 4, 2016, entitled "DEPARTURE SEQUENCING SYSTEMS AND METHODS," (aka U.S. Pat. No. 10,210,766 issued Feb. 19, 2019). The '184 application is a continuation of, claims priority to and the benefit of, U.S. Pat. No. 9,437,114 which issued on Sep. 6, 2016 (aka U.S. Ser. No. 13/833,761 filed on Mar. 15, 2013, entitled "DEPARTURE SEQUENCING SYSTEMS AND METHODS)." All of which are hereby incorporated by reference in their entirety for all purposes.

TECHNICAL FIELD

The present disclosure generally relates to operational modeling, and more particularly, to analysis methods and tools suitable for use in airline and airport ground control and air traffic control.

BACKGROUND

Airports are typically managed with a goal to achieve high flight throughput and minimize delays. When a flight is ready to depart, the pilot requests pushback from the gate. The request is evaluated by the ramp controller, and once pushback is allowed, the flight is pushed back from the gate and taxis to the runway for takeoff.

At an airport, taxi delays are primarily caused by an imbalance between airport capacity and demand. Additionally, the clustering of flights into bank structures, for example by airlines utilizing a hub and spoke model, contributes to the imbalance between demand and capacity. Up to a certain point, as the number of aircraft in an active taxi state increases, so does airport throughput. However, as the number of aircraft in a taxi state increases further, eventually saturation is observed, such that additional flights released for pushback result in increased taxi time and decreased airport throughput. Accordingly, improved airport air and surface flow management tools remain desirable.

SUMMARY

In an embodiment, a method comprises modeling, by a processor for departure sequencing, aircraft ground traffic at an airport over a simulation time horizon. The airport ground traffic comprises a plurality of aircraft scheduled for departure during the simulation time horizon. The method further comprises determining, by the processor, a suggested gate pushback time for each of the plurality of aircraft.

In another embodiment, a method for departure sequencing comprises: creating a graph network representation of an airport; associating business rules to state transitions in the graph network; repeatedly executing, by a processor for departure sequencing, the graph network representation to obtain suggested gate pushback times for a plurality of flights; and calibrating, by the processor, a parameter of the graph network representation utilizing historical flight information for the airport.

In another embodiment, a non-transitory computer-readable storage medium has computer-executable instructions stored thereon that, in response to execution by a processor for departure sequencing, causes the processor to perform operations comprising: modeling, by the processor, aircraft ground traffic at an airport over a simulation time horizon, wherein the airport ground traffic comprises a plurality of aircraft scheduled for departure during the simulation time horizon; and determining, by the processor, a suggested gate pushback time for each of the plurality of aircraft.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure or appended claims.

For the sake of brevity, conventional techniques for departure sequencing, operations management, statistical analysis, process optimization, software application development, and/or the like, may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical departure sequencing system.

Airlines and airports continually face challenges associated with efficient utilization of limited resources, for example planes, runways, etc. Typically, a ramp controller will release a flight for pushback when a pushback request is received, provided sufficient space exists in the taxi queue. However, the number of flights in a taxi condition often reaches a saturation point before the physical space in the taxi queue is depleted. Stated another way, it is usually possible to accommodate more flights in a taxi queue, than an optimal number for throughput purposes.

Figure 2A:
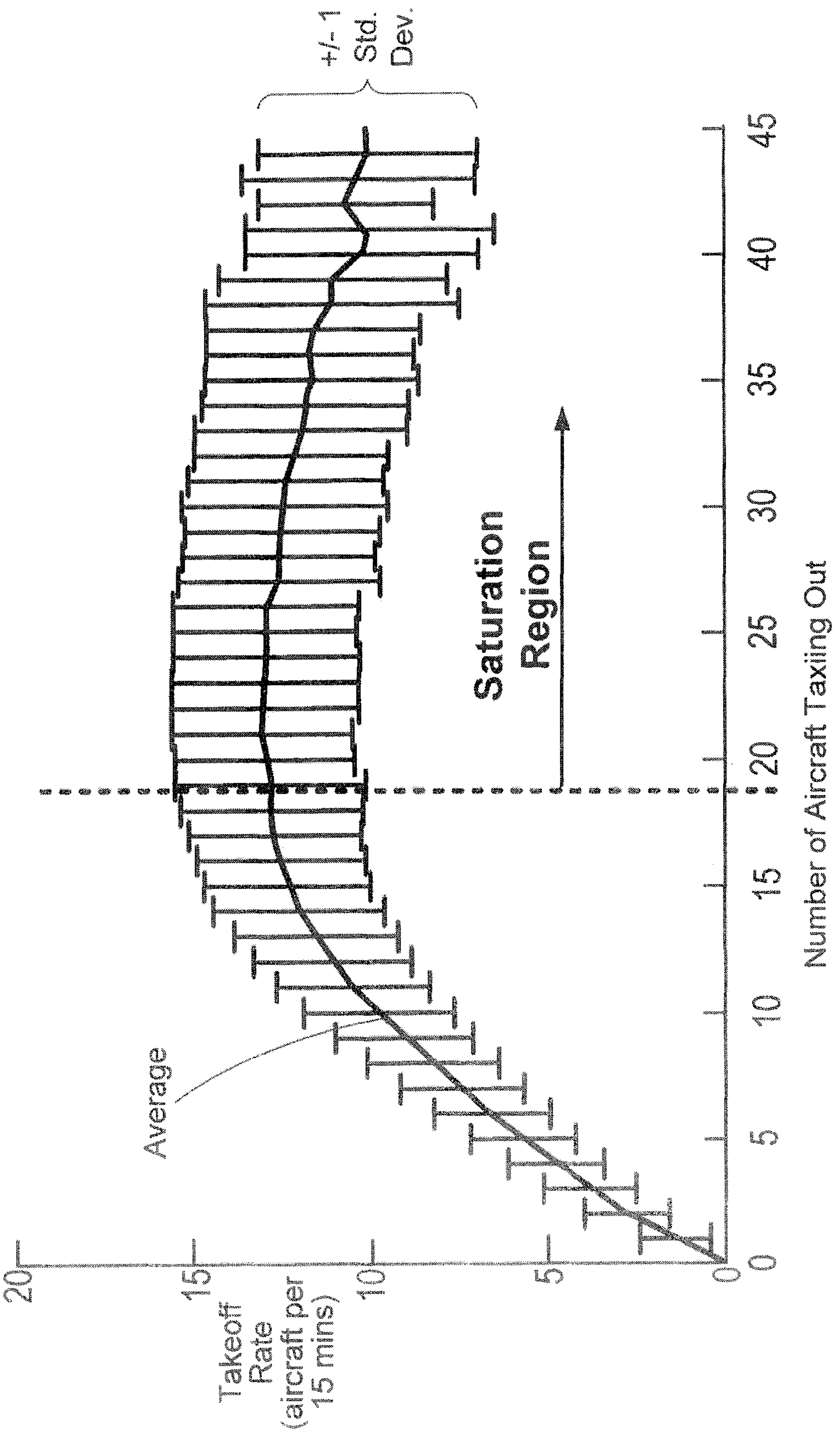
FIG. 2A illustrates a graph of airport throughput, in accordance with various embodiments.

Accordingly, releasing an excessive number of flights for pushback leads to excessive taxi time, for example as illustrated in FIG. 2A. Excessive taxi time leads directly to increased expenses associated with fuel burn, flight delays, crew compensation, missed connections, and/or the like. In FIG. 2A, it can be seen that airport throughput initially increases as more flights are released for pushback, but as still more flights are released for pushback, throughput plateaus and then declines, and variability increases.

In contrast, principles of the present disclosure contemplate improved departure scheduling methods and systems. By evaluating the airport state and implementing informed pushback decisions, ramp controllers can achieve improved airport throughput, reduce crew expenses, reduce fuel burn expenses and associated environmental impacts, and/or the like.

While the present disclosure discusses airlines, flights, pilots, flight attendants, ramp controllers, air traffic controllers, and/or the like for purposes of convenience and illustration, one of skill in the art will appreciate that the departure sequencing methods, systems, and tools disclosed herein are broadly applicable, for example to any industry wherein improved throughput is desirable.

Various embodiments of principles of the present disclosure employ forecasting, statistical analysis, and/or optimization techniques. For more information regarding such techniques refer to, for example: "The Theory and Practice of Revenue Management" (International Series in Operations Research & Management Science) by Kalyan T. Talluri and Garrett J. van Ryzin; "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary departure sequencing systems include a user interface ("UI"), software modules, logic engines, various databases, interfaces to systems and tools, and/or computer networks. While exemplary departure sequencing systems may contemplate upgrades or reconfigurations of existing processes and/or systems, changes to existing databases and system tools are not necessarily required by principles of the present disclosure.

The benefits provided by principles of the present disclosure include, for example, reduced fuel burn, increased airport throughput, decreased crew expenses, lower payroll costs, increased employee utilization, increased customer good will, increased planning and operational efficiency, increased employee morale, and the like. For example, an airport benefits from improved ramp controller performance, increasing throughput. An airline benefits from reduced fuel burn expenses and reduced crew expenses. Customers benefit from reduced flight delays arising from excessive time in the taxi queue.

As used herein, an "entity" may include any individual, software program, business, organization, government entity, web site, system, hardware, and/or any other entity. A "user" may include any entity that interacts with a system and/or participates in a process.

Figure 1:
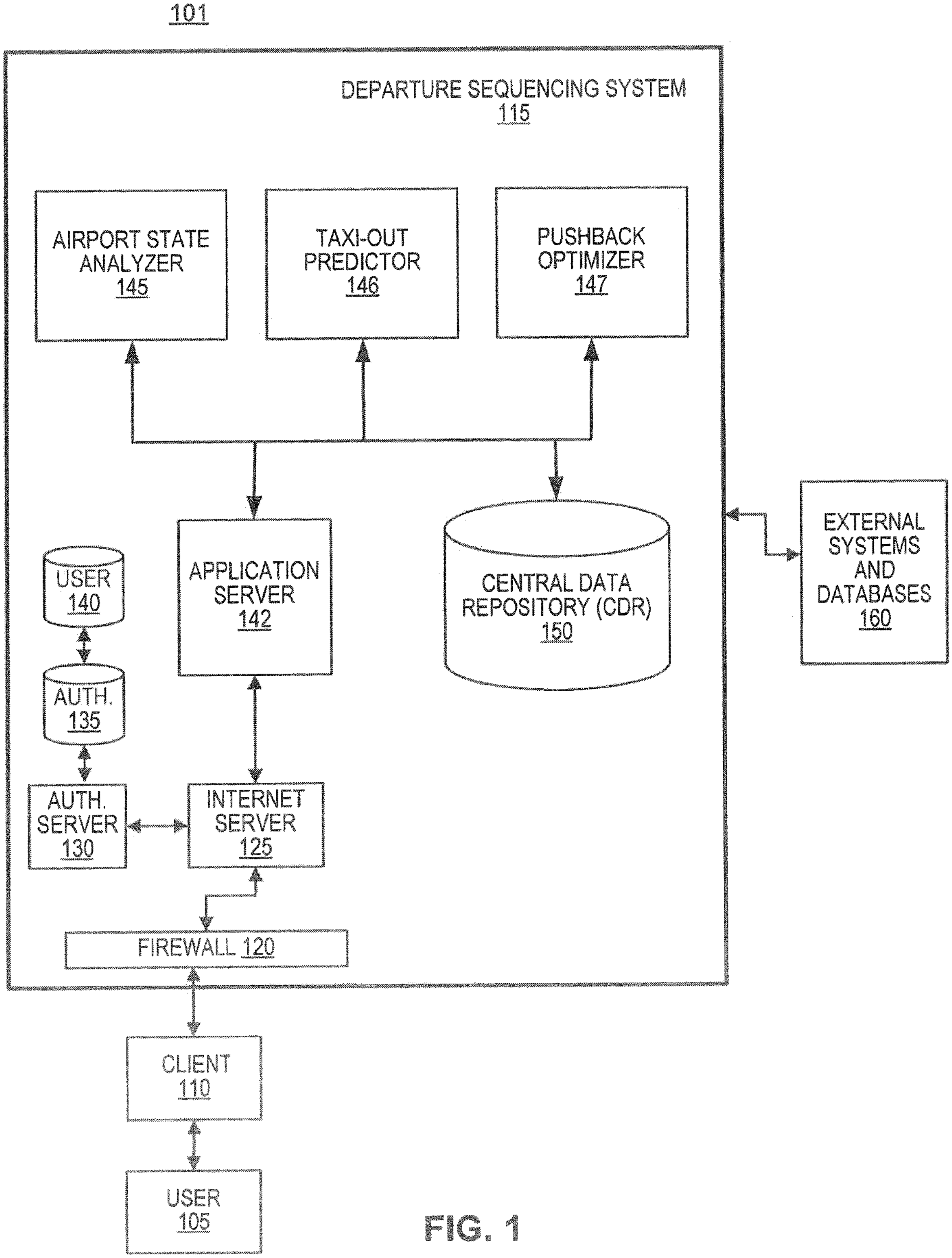
FIG. 1 is a block diagram illustrating exemplary departure sequencing system components, in accordance with various embodiments.

Turning now to FIG. 1, in accordance with various embodiments, a user 105 may perform tasks such as requesting, retrieving, receiving, updating, analyzing and/or modifying data. User 105 may also perform tasks such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a ramp controller, a member of a crew planning organization, a member of an operations research or systems analysis organization, a downstream system, an upstream system, a third-party system, a system administrator, and/or the like.

In various embodiments, a system 101 may include a user 105 interfacing with a departure sequencing system 115 by way of a client 110. Departure sequencing system 115 may be a partially or fully integrated system comprised of various subsystems, modules and databases. Client 110 comprises any hardware and/or software suitably configured to facilitate entering, accessing, requesting, retrieving, updating, analyzing, and/or modifying data. The data may include operational data (e.g., schedules, resources, routes, operational alerts, weather, etc.), airport data (for example, taxi queue information, runway information, arriving and/or departing flight information, and/or the like), cost data, forecasts, historical data, verification data, asset (e.g., airplane) data, regulatory data, authentication data, demographic data, transaction data, or any other suitable information discussed herein.

Client 110 includes any device (e.g., a computer), which communicates, in any manner discussed herein, with departure sequencing system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with departure sequencing system 115. For example, client 110 may access the services of departure sequencing system 115 through another server, which may have a direct or indirect connection to Internet server 125. Practitioners will further recognize that client 110 may present interfaces associated with a software application (e.g., SAS analytic software) or module that are provided to client 110 via application graphical user interfaces (GUIs) or other interfaces and are not necessarily associated with or dependent upon Internet browsers or internet specific protocols.

User 105 may communicate with departure sequencing system 115 through a firewall 120, for example to help ensure the integrity of departure sequencing system 115 components. Internet server 125 may include any hardware and/or software suitably configured to facilitate communications between the client 110 and one or more departure sequencing system 115 components.

Firewall 120, as used herein, may comprise any hardware and/or software suitably configured to protect departure sequencing system 115 components from users of other networks. Firewall 120 may reside in varying configurations including stateful inspection, proxy based and packet filtering, among others. Firewall 120 may be integrated as software within Internet server 125, or another system 101 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, departure sequencing system 115 is usable to: model airport behavior, taxi delays, throughput, and/or the like; generate recommendations for a ramp controller; generate inputs to other forecasting systems; and/or evaluate proposed courses of action. Continuing to reference FIG. 1, departure sequencing system 115 allows communication with central data repository (CDR) 150, and with various other databases, tools, UIs and systems, for example external systems and databases 160. Such systems include, for example, airline scheduling systems, air traffic control systems, ground traffic control systems, and/or the like. In various embodiments, external systems and databases 160 include the Aerobahn surface management system offered by Saab Sensis.

Departure sequencing system 115 components may be interconnected and communicate with one another to allow for a completely integrated departure sequencing system. In various embodiments, departure sequencing system 115 models airport behavior on a continuous and/or real-time basis. In other embodiments, departure sequencing system 115 models airport behavior on a discrete basis (for example, every fifteen seconds, every thirty seconds, every one minute, every two minutes, and/or the like). Ramp controllers may make flight pushback decisions based at least in part upon output of (and/or guidance or suggestions received from) departure sequencing system 115; moreover, pilots and other airline staff may make flight pushback requests based at least in part upon output of (and/or guidance or suggestions received from) departure sequencing system 115.

In various embodiments, certain departure sequencing system 115 modules (e.g., airport state analyzer 145, taxi-out predictor 146, and/or pushback optimizer 147) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating departure sequencing system 115 processes, initiating other software modules, triggering downstream systems and processes, encrypting and decrypting, and/or the like. Additionally, departure sequencing system 115 modules may include any hardware and/or software suitably configured to receive requests from client 110, for example via Internet server 125 and application server 142. It will be appreciated that, while airport state analyzer 145, taxi-out predictor 146, and/or pushback optimizer 147 are illustrated as separate modules in FIG. 1, in various embodiments components of departure sequencing system 115 (and/or functionality thereof) may be combined into fewer modules or components, or alternatively, divided into additional modules and/or components.

Departure sequencing system 115 modules may be further configured to process requests, execute transactions, construct database queries, and/or execute queries against databases within system 101 (e.g., CDR 150), external data sources and/or temporary databases. In various embodiments, one or more departure sequencing system 115 modules may be configured to execute application programming interfaces in order to communicate with a variety of messaging platforms, such as email systems, wireless communications systems, mobile communications systems, multimedia messaging service ("MMS") systems, short messaging service ("SMS") systems, and the like.

Departure sequencing system 115 modules may be configured to exchange data with other systems and application modules, for example, a ground traffic control system, and/or the like. In various embodiments, departure sequencing system 115 modules may be configured to interact with other system 101 components to perform complex calculations, retrieve additional data, format data into reports, create XML representations of data, construct markup language documents, construct, define or control UIs, and/or the like. Moreover, departure sequencing system 115 modules may reside as standalone systems or tools, or may be incorporated with the application server 142 or any other departure sequencing system 115 component as program code. As one of ordinary skill in the art will appreciate, departure sequencing system 115 modules may be logically or physically divided into various subcomponents, such as a workflow engine configured to evaluate predefined rules and to automate processes.

In addition to the components described above, departure sequencing system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases; and/or the like.

As will be appreciated by one of ordinary skill in the art, one or more departure sequencing system 115 components may be embodied as a customization of an existing system, an add-on product, upgraded software, a stand-alone system (e.g., kiosk), a distributed system, a method, a data processing system, a device for data processing, and/or a computer program product. Accordingly, individual departure sequencing system 115 components may take the form of an entirely software embodiment, an entirely hardware embodiment, or an embodiment combining aspects of both software and hardware. Furthermore, individual departure sequencing system 115 components may take the form of a computer program product on a computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Android, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and departure sequencing system 115 components may be independently, separately or collectively suitably coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

In various embodiments, components, modules, and/or engines of departure sequencing system 115 may be implemented as micro-applications or micro-apps. Micro-apps are typically deployed in the context of a mobile operating system, including for example, a Palm mobile operating system, a Windows mobile operating system, an Android operating system, Apple iOS, a Blackberry operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Internet server 125 may be configured to transmit data to client 110 within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) are used to enable departure sequencing system 115. Additionally, components such as Access or Microsoft SQL Server, Oracle, Sybase, InterBase, etc., may be used to provide an Active Data Object (ADO) compliant database management system.

Like Internet server 125, application server 142 may communicate with any number of other servers, databases and/or components through any means known in the art. Further, application server 142 may serve as a conduit between client 110 and the various systems and components of departure sequencing system 115. Internet server 125 may interface with application server 142 through any means known in the art including a LAN/WAN, for example. Application server 142 may further invoke software modules, such as airport state analyzer 145, taxi-out predictor 146, and/or pushback optimizer 147, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com/) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003).

Continuing to reference FIG. 1, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within departure sequencing system 115 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for departure sequencing system 115 users (e.g., user 105).

In various embodiments, CDR 150 is a data repository that may be configured to store a wide variety of comprehensive data for departure sequencing system 115. While depicted as a single logical entity in FIG. 1, those of skill in the art will appreciate that CDR 150 may, in various embodiments, consist of multiple physical and/or logical data sources. In various embodiments, CDR 150 stores taxi queue data, operational data, schedules, resource data, asset data, inventory data, personnel information, routes and route plans, station (e.g., airports or other terminals) data, operational alert data, weather information, passenger data, reservation data, cost data, optimization scenarios, optimization results, simulation results, booking class data, forecasts, historical data, verification data, authentication data, demographic data, legal data, regulatory data, transaction data, security profiles, access rules, content analysis rules, audit records, predefined rules, process definitions, financial data, and the like. For example, a data source or component database of CDR 150 includes, but is not limited to, the airport arrival/departure configuration, a list of aircraft on the airport surface, aircraft location and speed including aircraft history information, incoming aircraft forecast information, aircraft pushback candidate information, and/or the like.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Washington), MySQL by MySQL AB (Uppsala, Sweden), Ehcache, Couchbase, VoltDB, Versant, Hazelcast, or any other suitable database product, for example a persistent and distributed in-memory database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. Examples include distributing data elements to grid memory, optimizing partitioning of memory objects to process, indexing frequently used files and placing on separate file systems to reduce In/Out ("I/O") bottlenecks.

One skilled in the art will also appreciate that, for security reasons, any databases, systems, devices, servers or other components of system 101 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, and the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

With continued reference to FIG. 1, in various embodiments, user 105 logs onto an application (e.g., a module) and Internet server 125 may invoke an application server 142. Application server 142 invokes logic in the departure sequencing system 115 modules by passing parameters relating to user's 105 requests for data. Departure sequencing system 115 manages requests for data from departure sequencing system 115 modules and/or communicates with system 101 components. Transmissions between user 105 and Internet server 125 may pass through a firewall 120 to help ensure the integrity of departure sequencing system 115 components. Practitioners will appreciate that exemplary embodiments may incorporate any number of security schemes or none at all. In various embodiments, Internet server 125 receives requests from client 110 and interacts with various other system 101 components to perform tasks related to requests from client 110.

Internet server 125 may invoke an authentication server 130 to verify the identity of user 105 and assign roles, access rights and/or permissions to user 105. In order to control access to the application server 142 or any other component of departure sequencing system 115, Internet server 125 may invoke an authentication server 130 in response to user 105 submissions of authentication credentials received at Internet server 125. In response to a request to access system 101 being received from Internet server 125, Internet server 125 determines if authentication is required and transmits a prompt to client 110. User 105 enters authentication data at client 110, which transmits the authentication data to Internet server 125. Internet server 125 passes the authentication data to authentication server 130 which queries the user database 140 for corresponding credentials. In response to user 105 being authenticated, user 105 may access various applications and their corresponding data sources.

Figure 2B:
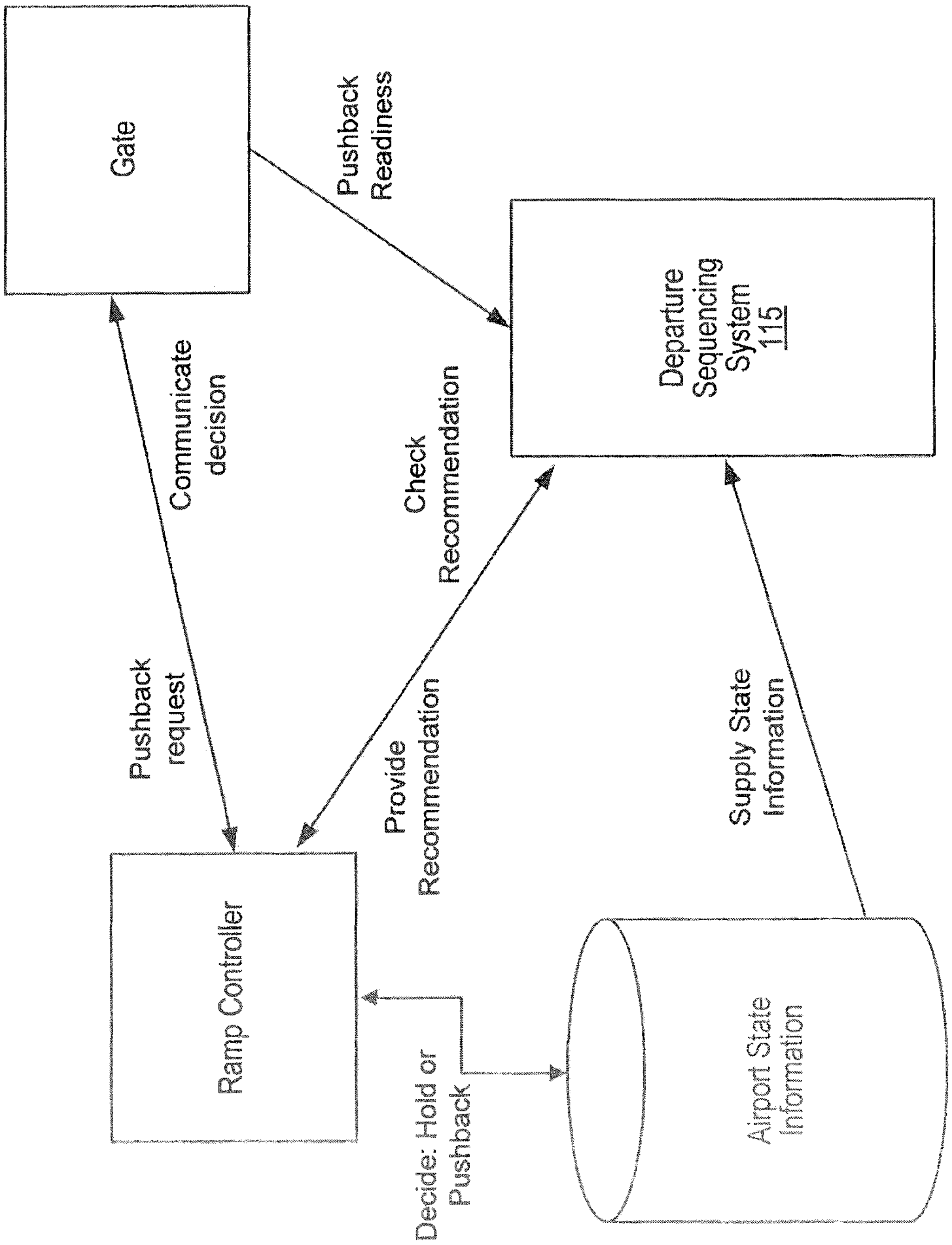
FIG. 2B is a block diagram illustrating use of an exemplary departure sequencing system, in accordance with various embodiments.
Figure 2C:
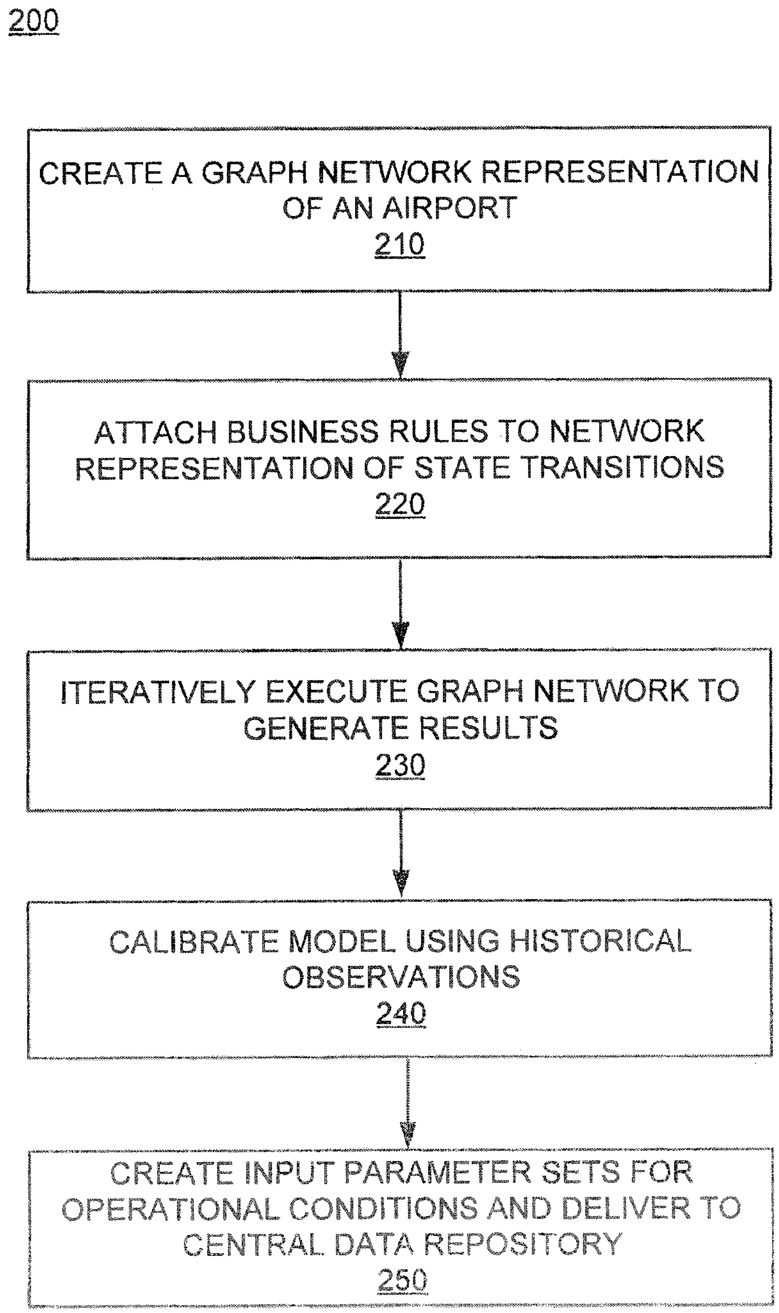
FIG. 2C illustrates an exemplary method for departure sequencing, in accordance with various embodiments.

With reference now to FIGS. 1 through 2C, in various embodiments, departure sequencing system 115 and/or method 200 utilize a model for departure sequencing configured to evaluate the effect of each flight pushback on airport operations. Moreover, departure sequencing system 115 is usable to extend situational awareness of ramp controllers to the whole airport operations, covering both ground and airspace (which may be controlled by air traffic control or other third parties).

In various embodiments, departure sequencing system 115 is configured with a discrete event simulation model configured to forecast taxi times and potential future gate conflicts. In various embodiments, departure sequencing system 115 comprises airport state analyzer 145, taxi-out predictor 146, and pushback optimizer 147.

Airport state analyzer 145 monitors airport configuration, airspace restrictions, take-offs, landings, ramp and taxi movements, and the like. Airport state analyzer 145 may monitor on a continuous basis; alternatively, airport state analyzer 145 may monitor on a discrete basis (for example, every 5 seconds, every 10 seconds, every 20 seconds, and/or the like). Functionally, airport state analyzer 145 estimates which of various profiles is suitable and/or best to use for simulation parameters in departure sequencing system 115, for example in taxi-out predictor 146. Such parameters may include, but are not limited to, runway configuration and throughput rates, aircraft ground speed, runway procedures, aircraft flows and various operating characteristics. In various embodiments, simulation parameters generated by airport state analyzer 145 cover the full simulation period of taxi-out predictor. Moreover, different sets of parameters may be utilized for different time periods of the simulation. For example, a first set of parameters may be utilized for the first 15 minutes of the simulation, and a second set of parameters may be utilized for the second 15 minutes of the simulation.

In various embodiments, airport state analyzer 145 communicates with CDR 150 to obtain and/or return suitable data, for example airport operating characteristics and airport operating conditions (which may be obtained from external sources, for example the FAA, air traffic control, and/or the like). Airport state information may include both the current live state of the airport, as well as future state expectations for a given departure sequencing period (for example, 30 minutes). Additionally, airport state information may be user-defined in order for departure sequencing system 115 to assess and/or model hypothetical situations.

In some embodiments, departure sequencing system 115 comprises taxi-out predictor 146. Taxi-out predictor 146 may be tightly coupled to a pushback optimizer 147.

In various embodiments, departure sequencing system 115 and/or components thereof (for example, taxi-out predictor 146) utilizes a stochastic simulation model, and is configured to evaluate a large number of simulation runs for a scenario provided by pushback optimizer 147 (for example, 100 runs, 500 runs, 1000 runs, and/or the like; in general, any suitable number of runs may be utilized). A scenario is a forward-looking simulation of an airport state including a defined set of pushback/hold decisions for each aircraft. Airport state may be the current observed state of the airport, airspace, air traffic control environment, future expectations, and the like. Airport state may represent actual operating conditions; airport state may also represent hypothetical conditions or parameters.

Taxi-out predictor 146 determines taxi-out times for a given airport state for all departing flights (i.e., at gate or already pushed back). Taxi-out predictor 146 may utilize a stochastic approach and determine estimated times via simulation; historical information may also be utilized.

In various embodiments, taxi-out predictor 146 simulates the current state of an airport multiple times, for example 1000 times. For each simulation cycle, taxi-out predictor 146 calculates each flight's simulated taxi time, measures ground congestion (i.e., aircraft density based on area), and records taxi conflicts and gate conflicts which are resolved by a business rules engine. Taxi-out predictor 146 may provide expectations to a ramp controller, for example estimates of each flight's taxi path, taxi time and variance, take-off sequence and runway queue and status, and congestion and conflicts based on a timeline.

In various embodiments, components of departure sequencing system 115 (for example, taxi-out predictor 146) is initialized with a snapshot of an airport state, which may include location of aircraft on the airport surface, location of aircraft on final approach, estimated arrivals and departures within a simulation time horizon, and/or airport operating characteristics (e.g., weather conditions, airport runway configuration, runway rates, active taxi paths, and/or the like). Moreover, departure sequencing system 115 may utilize any suitable airport or airline information.

In various embodiments, pushback optimizer 147 is configured to generate a set of feasible pushback/hold scenarios, and return a list of one or more preferable and/or optimal scenarios (for example, a best value scenario). To value scenarios, pushback optimizer 147 may be configured with a business objective function (which may be updatable and/or user-defined) that evaluates each pushback/hold scenario. Exemplary objective functions include minimizing taxi times, maximizing throughput, or any other operational airport or airline performance objective or combination of objectives. Evaluation of the scenarios may be accomplished using a discrete event simulation model.

Pushback optimizer 147 utilizes taxi-out predictor 146, which may be configured as a discrete event simulation model configured to forecast taxi paths, taxi times, potential future gate conflicts, evaluate various pushback patterns, and/or the like. Based at least in part on the predicted taxi times, pushback optimizer 147 may assign pushback times for each flight. In various embodiments, pushback optimizer 147 evaluates alternative feasible pushback patterns. A pattern may be a set of hold/release decisions for all flights expected to depart within a timeframe, for example 5 minutes, 10 minutes, and/or the like. A hold decision may comprise the number of minutes of hold for a flight, as compared to immediate departure of the flight at the current time.

Pushback optimizer 147 may provide results of various different courses of action, which may be sorted and/or ranked, for example by value. A particular course of action may comprise suggested pushback time(s) for a flight or set of flights, configured to optimize one or more business objectives. Thus, pushback optimizer 147 may be usable to create an optimal solution that maintains or increases airport throughput, minimizes the number of ground or gate conflicts, and maximizes the number of taxi minutes saved. In this manner, a user 105 may quickly evaluate a decision or set of potential decisions during ramp operations.

Departure sequencing system 115 may present a recommended course of action (for example, recommended by pushback optimizer 147) to a user 105, for example a ramp controller, via any suitable method, for example a graphical user interface.

In this manner, departure sequencing system 115 can reduce and/or minimize airport ramp congestion (and/or maximize airport throughput), for any given airport state within a simulation time horizon. A simulation time horizon may be any suitable time horizon, for example 15 minutes, 30 minutes, 45 minutes, one hour, and/or the like. In various embodiments, the model is based on and/or utilizes actual airport and airspace rules and constraints. Historical data may be utilized to generate input parameters for departure sequencing system 115.

It will be appreciated that departure sequencing system 115 and/or components thereof may be initialized with actual information, for example during live ramp operation; additionally, departure sequencing system 115 may be initialized with hypothetical and/or modeled information. Therefore, departure sequencing system 115 may suitably be utilized by decision makers (for example, ramp controllers) and/or external decision systems to evaluate various scenarios and/or suggest courses of action, either for real-world events or for hypothetical scenarios.

In various embodiments, after departure sequencing system 115 is initialized, taxi-out predictor 146 executes multiple replications for state transitions of aircraft within the simulation time horizon. The simulation time horizon may be any suitable time horizon, but is commonly 30 minutes. During operation, taxi-out predictor 146 simulates the movement of an arriving flight to its arrival gate, and the movement of a departing flight to its runway.

For arrivals, taxi-out predictor 146 may consider the initial state of an aircraft position to be anywhere between final approach and the planned arrival gate. Moreover, any flight estimated to enter airport airspace within the simulated time horizon may similarly be included in the model. An arriving flight may be considered to be in the airspace (i.e., between final approach and runways), on the airport (i.e., between runways and gates, or more generally, between a particular location and a gate), or at a gate.

For departures, taxi-out predictor 146 may consider the initial state of an aircraft position to be anywhere between its departure gate and runway. Moreover, any flight scheduled for departure within the simulation time horizon may likewise be included in the model. A departing flight may be considered to be at a gate, on the airport (i.e., between gates and runway, or more generally, between a particular location and the runway), or on a runway.

In various embodiments, with momentary reference to FIG. 2C, in departure sequencing system 115 and/or components thereof (for example, taxi-out predictor 146), an airport simulation network may be constructed and/or utilized in connection with method 200, by creating a graph network representation of the airport (step 210), attaching business rules to network representations of state transitions (step 220), iteratively executing the graph network model to generate modeled results (step 230), and calibrating the network model using historical observations (step 240). Based at least in part on different airport operating characteristics, suitable calibrated parameters are created (step 250).

In various embodiments, in taxi-out predictor 146, an airport simulation network comprises a directed graph. In the network, the following objects may be defined and utilized:

Node. A node is a location or spot on the airport. Nodes are connected by links, and typically have no capacity. Nodes are typically placed to represent ground taxi path intersections, airspace path intersections, and/or the like.

Gate Node. A gate node is a special node that represents an aircraft gate. A gate node has the capacity of holding one aircraft.

Ground Link. A ground link represents a portion of a (or an entire) taxi path on an airport surface. The capacity of a ground link may vary, for example depending on the length of the link, the dimensions of various aircraft, and/or the like. Ground links may be directional.

AirLink. An airlink represents an airspace path for arriving aircraft. Final approach links have a capacity of one aircraft.

Runway. A runway is constructed from multiple ground links and also comprises an entrance node and an exit node. For arriving aircraft, a runway is attached to a final approach airlink.

Runway Crossing. A runway crossing is attached to a runway, and represents special rules associated with crossing that runway. A runway crossing includes a crossing node and ground links.

In various embodiments, departure sequencing system 115 and/or components thereof (for example, taxi-out predictor 146) may utilize information about an airport from any suitable source, for example airport architectural drawings, public records, survey information, web-based mapping utilities, and/or the like.

In taxi-out predictor 146, business rules may be applied to events, state transitions, and entities within a simulation framework. Business rules may be generated and/or collected from any suitable source, for example tower personnel at an airport, FAA observations, airline policies, regulations, and/or the like.

In taxi-out predictor 146, each aircraft may be viewed as a single entity. Each aircraft has a potential event set, for example: LeaveGate, MoveOnLink, EnterNodeArea, PassNode, LeaveNodeArea, TakeOff, PassRwyNode, EnterAirLink, LandOnRwy, and ExitRwy. In various embodiments, additional and/or fewer events may be included in an event set.

In operation of taxi-out predictor 146, each aircraft entity is registered in the simulation and a particular event list (set of sequenced events) is scheduled with business rules. In various embodiments, for a departing aircraft entity, the following events can be scheduled:

LeaveGate: Schedules the flight's departure time and initializes the flight status. It may be modeled on Gate Node business rules.

MoveOnLink: Moves the departing entity on a ground link and calculates time for the aircraft to pass the link distance. It may be retrieved from historical speed table business rules, for example, for that ground link.

EnterNodeArea: May be called when an aircraft is approaching a node. If the next ground link has available capacity and the node is not occupied by other aircraft, the current aircraft will occupy the node and enter the node area. Potential future directional head-to-head aircraft conflicts with other aircraft may also be checked to avoid gridlock.

PassNode: Removes the current aircraft from the last ground link and adds it to the next ground link. If any other aircraft are waiting on the last ground link, the event will trigger to move them forward as more space is made available on the ground link.

LeaveNodeArea: Releases the node of the currently occupying aircraft. If another aircraft is waiting for the node, an EnterNodeArea trigger is created for that aircraft.

TakeOff: Calculates and records statistics of taxi time, e.g., total taxi time, total waiting time, location and duration of wait times, and/or the like. It may contain business rules for runway occupancy and take-off procedures. Moreover, it may implement business rules for checking runway blockage, for example by arrival or crossings. After TakeOff, a runway can trigger another TakeOff event if there is an aircraft waiting on the runway entrance node and no blockage is applied.

PassRwyNode: Calculates the time for the active arrival or departure aircraft to pass the current runway node. It may trigger runway crossing.

Figure 5:
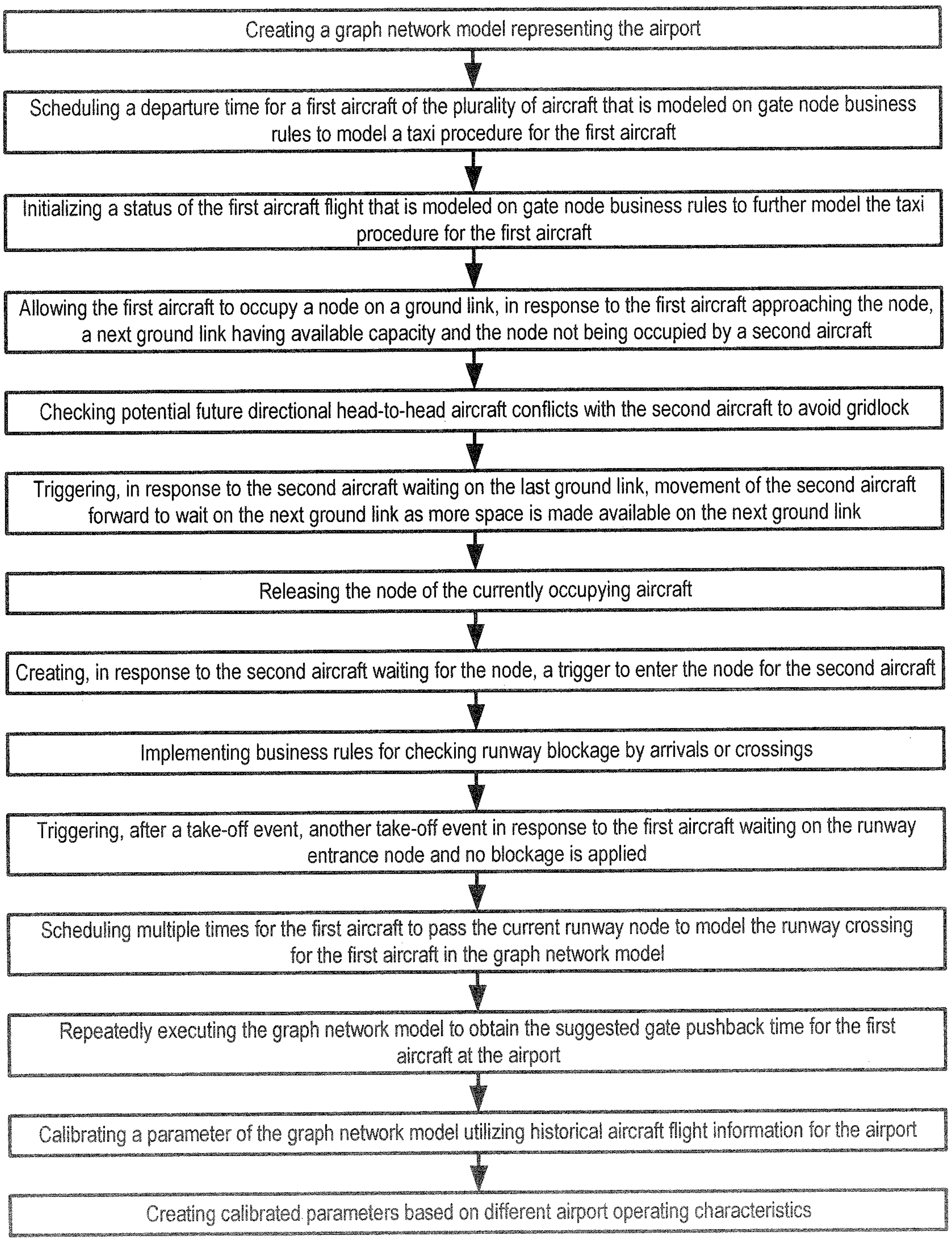
FIG. 5 illustrates an exemplary method for obtaining a suggested gate pushback time, in accordance with various embodiments.

As set forth in FIG. 5, in various embodiments, a method for departure sequencing of a plurality of aircraft at an airport may comprise creating, by a computer, a graph network model representing the airport by utilizing information about an airport from, for example, airport architectural drawings, public records, survey information, and web-based mapping utilities. The method may further comprise scheduling, by the computer, a departure time for a first aircraft of the plurality of aircraft that is modeled on gate node business rules to model a taxi procedure for the first aircraft; initializing, by the computer, a status of the first aircraft flight that is modeled on gate node business rules to further model the taxi procedure for the first aircraft. The method may also include allowing, by the computer, the first aircraft to occupy a node on a ground link, in response to the first aircraft approaching the node, a next ground link having available capacity and the node not being occupied by a second aircraft. The method may also include checking, by the computer, potential future directional head-to-head aircraft conflicts with the second aircraft to avoid gridlock. The method may also include triggering, by the computer and in response to the second aircraft waiting on the last ground link, movement of the second aircraft forward to wait on the next ground link as more space is made available on the next ground link. The method may also include releasing, by the computer, the node of the currently occupying aircraft. The method may also include creating, by the computer and in response to the second aircraft waiting for the node, a trigger to enter the node for the second aircraft. The method may also include implementing, by the computer, business rules for checking runway blockage by arrivals or crossings. The method may also include triggering, by the computer and after a take-off event, another take-off event in response to the first aircraft waiting on the runway entrance node and no blockage is applied. The method may also include scheduling, by the computer, multiple times for the first aircraft to pass the current runway node to model the runway crossing for the first aircraft in the graph network model. The method may also include repeatedly executing, by the computer, the graph network model to obtain the suggested gate pushback time for the first aircraft at the airport based on the assessing of the connection information. The method may also include calibrating, by the computer, a parameter of the graph network model utilizing historical aircraft flight information for the airport. The method may also include creating, by the computer, calibrated parameters based on different operating characteristics of the airport. In taxi-out predictor 146, MoveOnLink, EnterNodeArea, PassNode, and LeaveNodeArea can be scheduled multiple times to model the taxi procedure for a single aircraft entity. PassRwyNode can also be scheduled multiple times to model the runway crossing for a single aircraft entity. Moreover, any suitable events or combinations thereof may be utilized to model and/or simulate airport ground and/or air operations.

Figure 6:
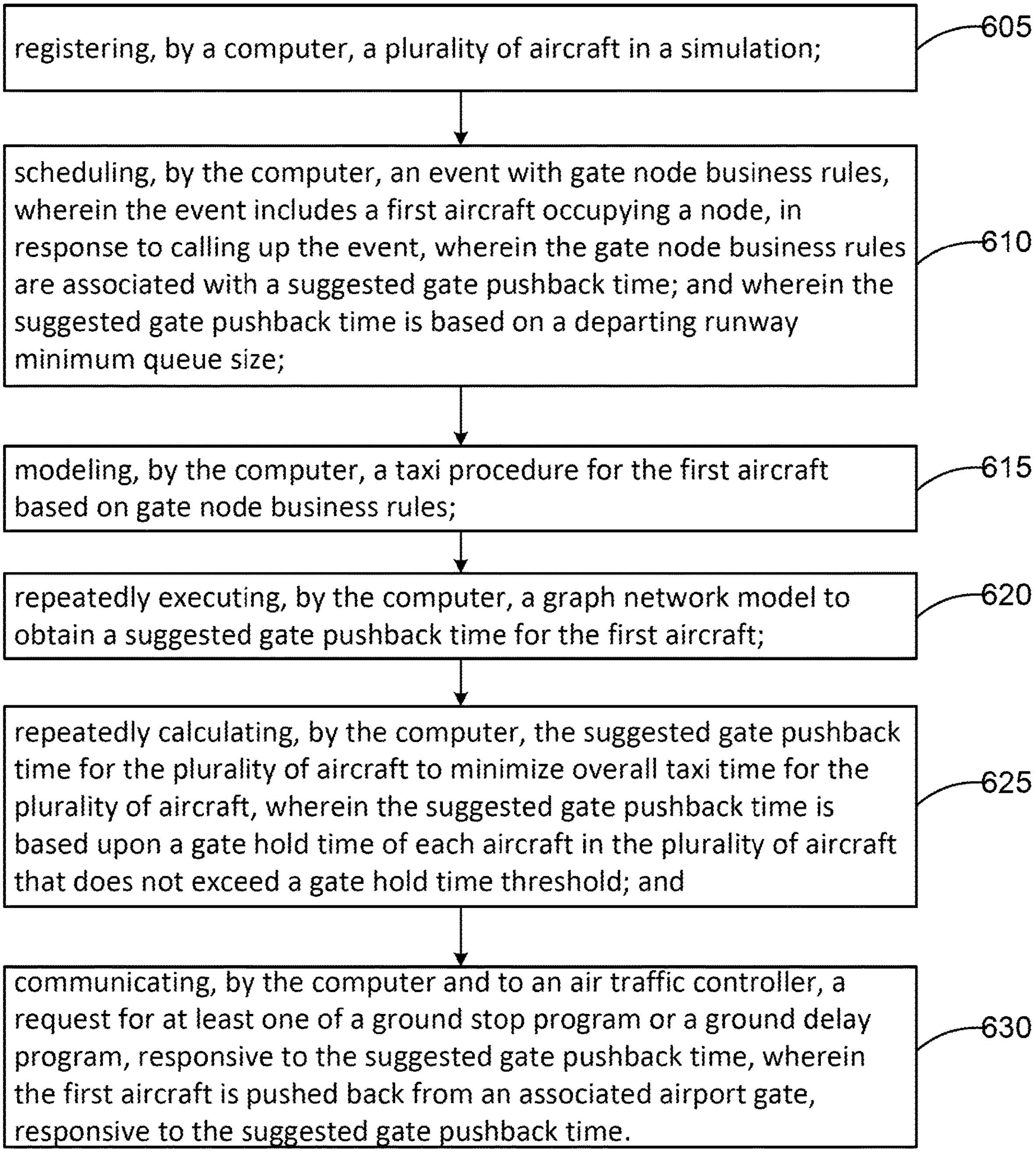
FIG. 6 illustrates another exemplary method for obtaining a suggested gate pushback time, in accordance with various embodiments.

As set forth in FIG. 6, in various embodiments, a method for obtaining a suggested gate pushback time may comprise registering, by a computer, a plurality of aircraft in a simulation (step 605); scheduling, by the computer, an event with gate node business rules, wherein the event includes a first aircraft occupying a node, in response to calling up the event, wherein the gate node business rules are associated with a suggested gate pushback time, and wherein the suggested gate pushback time is based on a departing runway minimum queue size (step 610); modeling, by the computer, a taxi procedure for the first aircraft based on gate node business rules (step 615); repeatedly executing, by the computer, a graph network model to obtain a suggested gate pushback time for the first aircraft (step 620); repeatedly calculating, by the computer, the suggested gate pushback time for the plurality of aircraft to minimize overall taxi time for the plurality of aircraft, wherein the suggested gate pushback time is based upon a gate hold time of each aircraft in the plurality of aircraft that does not exceed a gate hold time threshold (step 625); and communicating, by the computer and to an air traffic controller, a request for at least one of a ground stop program or a ground delay program, responsive to the suggested gate pushback time, wherein the first aircraft is pushed back from an associated airport gate, responsive to the suggested gate pushback time (step 630).

In various embodiments, in taxi-out predictor 146, for an arrival aircraft entity the following events can be scheduled:

EnterAirLink: Moves the arriving aircraft on the final approach airspace path. It will block associated runway(s) for departures at a pre-defined distance, and will also block runway crossings at a pre-defined time-to-runway.

LandOnRwy: Removes the current aircraft from AirLink and adds it to a runway. Based on business rules, it will also release departure queuing aircraft.

ExitRwy: Exits aircraft entity from runway and prepares to taxi to a gate.

MoveOnLink, EnterNodeArea, PassNode, LeaveNodeArea, and PassRwyNode: Operate in a manner similar to that for a departing aircraft entity, discussed above.

EnterGate: Calculates and records statistics of taxi time, e.g., total taxi time, total waiting time, location and duration of wait times, and/or the like.

It will be appreciated that, in departure sequencing system 115 and/or components thereof (for example, taxi-out predictor 146), in live ramp operations the foregoing events utilize information regarding real-time airport characteristics including rates and configuration to drive simulation parameters.

In various embodiments, taxi-out predictor 146 is configured with (and/or configured to utilize) various entity business rules. In various embodiments, taxi-out predictor 146 utilizes business rules associated with the following:

Aircraft Path. Before an aircraft moves, its path may be obtained first. In airport operation, aircraft taxi paths are typically pre-defined by the FAA and/or ramp control. Taxi-out predictor 146 may model such pre-defined paths, for example using a shortest-path algorithm to cover the tremendously large combination of paths that can be taken. Moreover, the actual path of an aircraft can vary among multiple possibilities, taking any of the available taxi paths in airport operations. In taxi-out predictor 146, these pre-defined paths and actual paths may be modeled statistically (i.e., utilizing probability models) and/or algorithmically (i.e., utilizing shortest-path algorithms).

Pushback Time. In taxi-out predictor 146, gate areas may be separated into several pushback zones. Each zone has its own pushback time distribution, which may be obtained from historical observations or other suitable data. Each gate node belongs to a pushback zone. As a result, in taxi-out predictor 146, aircraft pushbacks may be modeled based on pushback zone characteristics.

Taxi Speed. In taxi-out predictor 146, the taxi paths of an airport may be separated into several different speed zones. Each zone has its own speed distribution, which may be calculated from historical data or otherwise selected. Each ground link belongs to one taxi zone. When an aircraft is traveling on the ground link, speed may be calculated based at least in part on the ground link's speed zone distribution.

Runway Procedures. In taxi-out predictor 146, runway procedures define separation of arriving and departing aircraft on the same or inter-related runways. The separations may be obtained from historical observations, for example based on aircraft types. TakeOff and LandOnRwy events may use these distributions to calculate simulated runway separations.

Departure sequencing system 115 is usable as a decision support tool, for example by a ramp controller, in order to make decisions such as (i) release a flight for pushback, or (ii) hold a flight at the gate. As a continually running service, pushback optimizer 147 may run and generate all feasible decisions by a ramp controller. When the ramp controller is tasked with making a decision, departure sequencing system 115 (for example, via client 110 or any other suitable means) can provide information to a ramp controller regarding an optimal recommendation to (i) release a flight for pushback or (ii) hold a flight at the gate.

Additionally, departure sequencing system 115 may provide an optimally valued suggested hold time (for example, 30 seconds, one minute, two minutes, three minutes, five minutes, ten minutes, and/or the like) before releasing a flight for pushback. In this manner, departure sequencing system 115 can reduce fuel costs (by avoiding premature pushback, and consequently reducing the amount of fuel burned while waiting in a taxi queue). Similarly, departure sequencing system 115 can reduce crew expenses (for example, pilot compensation expenses, which may begin accruing once the cabin door is closed and the aircraft parking brake is released).

Via use of departure sequencing system 115, improved and/or optimal departure sequencing may be obtained without requiring change to current ramp practices or scheduling systems. Stated another way, departure sequencing system 115 provides current and/or real-time suggestions based on predictions of aircraft taxiing behavior and/or performance, allowing ramp controllers to make improved pushback decisions by utilizing real-time decision support.

Departure sequencing system 115 improves gate departure sequencing for ramp controllers. Additionally, departure sequencing system 115 maintains and increases runway throughput without gaps or separation. Yet further, departure sequencing system 115 optimizes delivery of aircraft in accordance with an airline's business objectives, such as on-time performance. Additionally, departure sequencing system 115 may be utilized to provide additional ground time for making passenger and bag connections, which would otherwise not have been possible as the aircraft would be in the taxi queue rather than at the gate.

In various embodiments, departure sequencing system 115 may be configured to adhere to various general guidelines, for example: maintenance of a departing runway minimum queue size; avoidance of a threshold for maximum departing runway queue size; ensuring the hold time of any aircraft does not exceed a threshold; reducing or eliminating gate conflicts for arriving aircraft, and/or the like.

In various embodiments, departure sequencing system 115 comprises software written in the Java programming language from Oracle Corporation, and is operable on Java SE 1.7 update 11. In this embodiment, departure sequencing system 115 may have modest hardware requirements; for example, departure sequencing system 115 may be operable on an Intel i5-2520M CPU or equivalent, and utilize less than 1 GB of random access memory. Depending on operational characteristics and to adhere to desired response times for a user 105, departure sequencing system 115 may include a set of connected computational servers, for example a computational server for each of pushback optimizer 147 generating pushback scenarios, airport state analyzer 145 generating taxi simulation parameters, and taxi-out predictor 146 determining the outcome of various scenarios.

Departure sequencing system 115 is extensible to all aspects of an airport. Accordingly, departure sequencing system 115 is suitable for use with multi-controller and multi-runway airports.

In contrast to prior approaches, departure sequencing system 115 provides real-time algorithmic situational awareness, stochastic fast-time simulation, and business-goal driven pushback optimization, all without necessitating any change to ramp procedures, scheduling procedures, airport procedures, or air traffic control procedures.

It will be appreciated that, in various embodiments, the simulation time horizon in departure sequencing system 115 may be extended, for example to 3 hours, to forecast future periods of airport congestion and/or to work with FAA air traffic control or other third parties to take actions (for example, implementing ground stop or ground delay programs) to reduce, mitigate, and/or eliminate potential gridlock situations.

Figure 3:
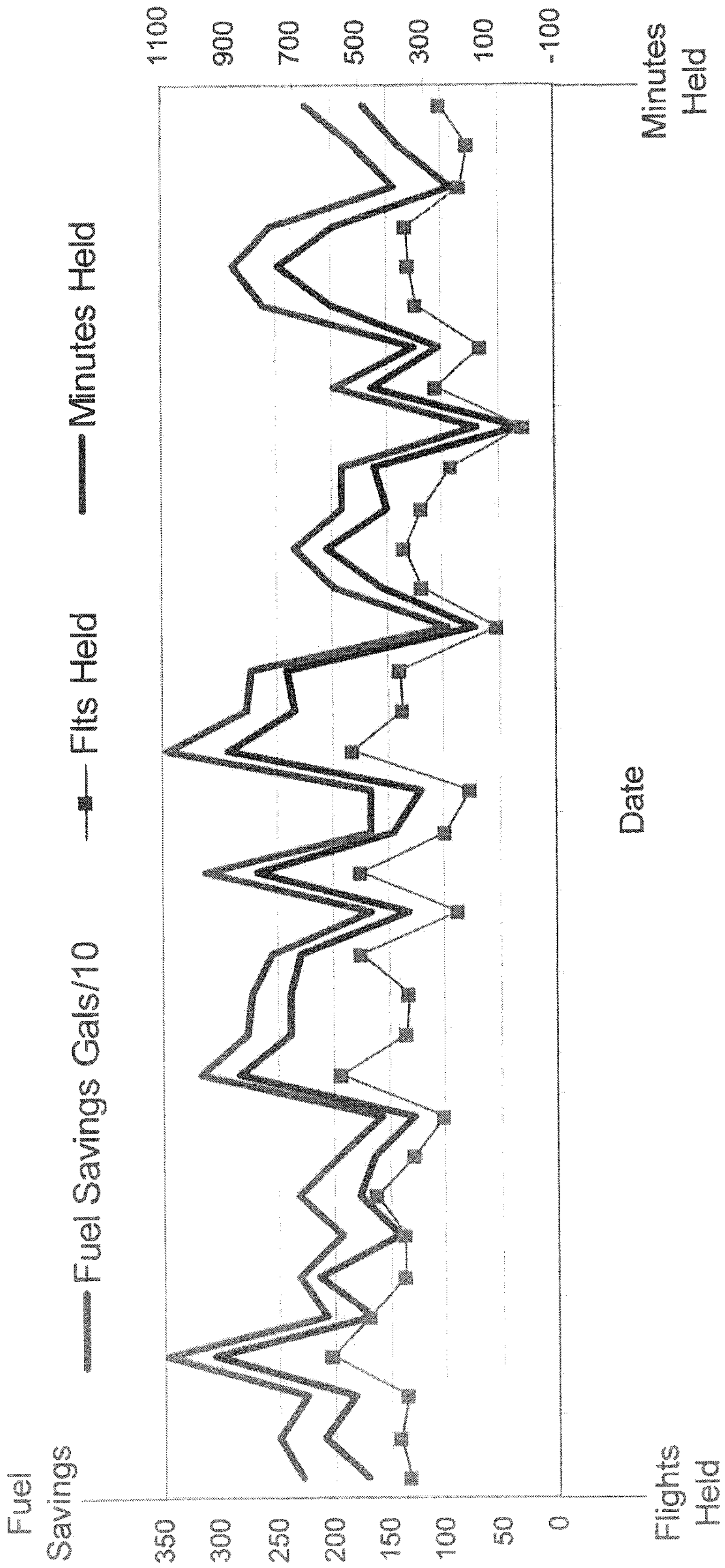
FIG. 3 illustrates results of operation of an exemplary departure sequencing system, in accordance with various embodiments.
Figure 4:
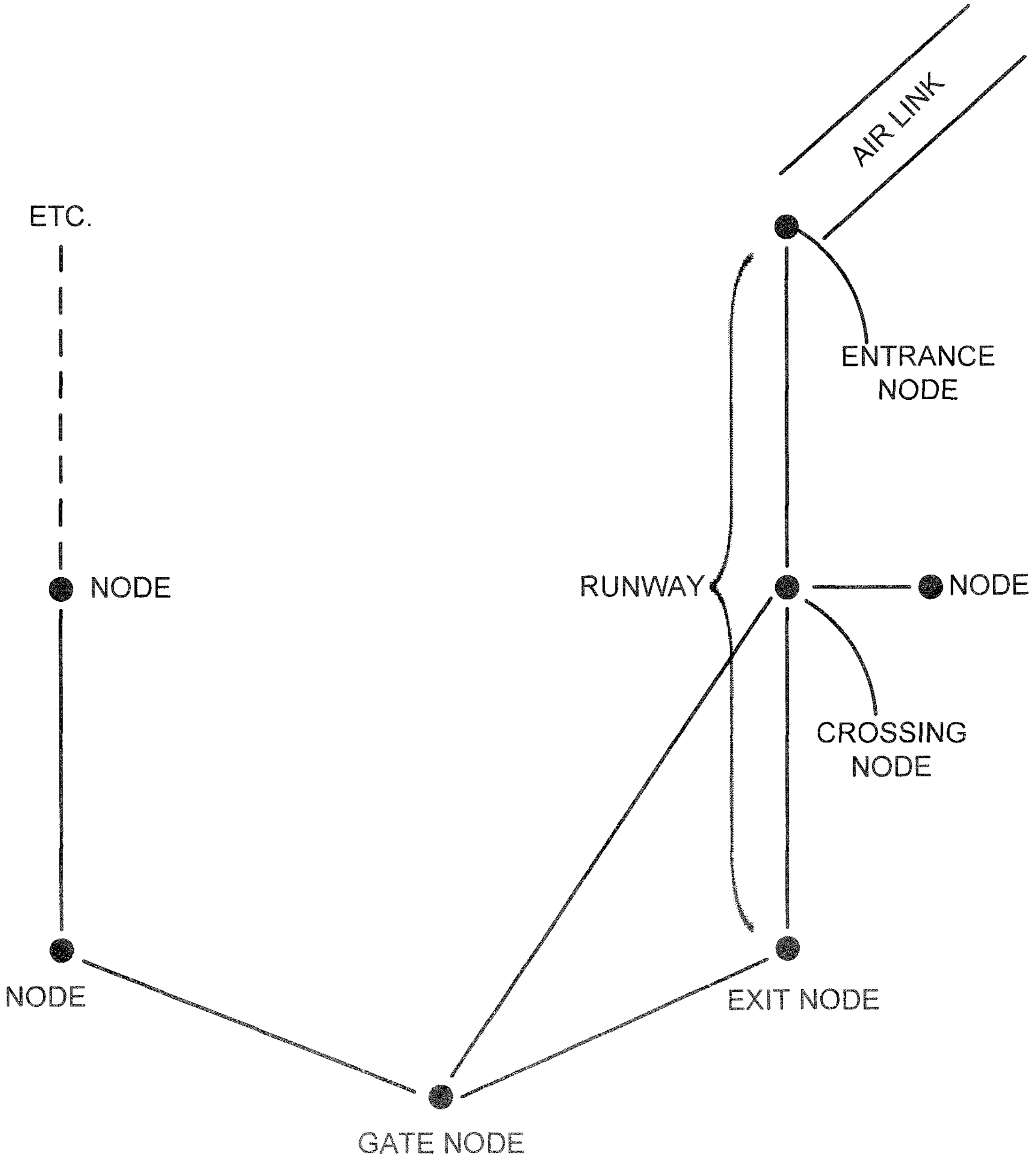
FIG. 4 illustrates a graph network model shown as a directed graph, in accordance with various embodiments.

Turning now to FIG. 3, in accordance with various embodiments, exemplary results of operation of departure sequencing system 115 at one airport are illustrated. Over an exemplary 35 day period, responsive to operation of departure sequencing system 115, an average of 123 flights a day were held for between 1 and 15 minutes, rather than being immediately released for pushback. The holds resulted in saving, over the course of the 35 days, over 22,500 minutes of taxi out time. Utilizing aircraft specific single engine taxi fuel burn rates for the held flights, significant fuel savings were calculated as well, with some days exceeding 3000 gallons of fuel saved per day. Annual estimated savings associated with reduced fuel burn alone were estimated to exceed $1.6M.

Principles and features of the present disclosure may suitably be combined with principles of revenue management, for example as disclosed in U.S. patent application Ser. No. 13/348,417 entitled "Overbooking, Forecasting, and Optimization Methods and Systems" filed on Jan. 11, 2012, (now U.S. Patent Application Publication No. 2013-0132128), which is incorporated herein by reference in its entirety.

Principles and features of the present disclosure may suitably be combined with principles of forecasting, demand modeling, and/or the like, for example as disclosed in U.S. patent application Ser. No. 13/791,672 entitled "Demand Forecasting Systems and Methods Utilizing Unobscuring and Unconstraining" filed on Mar. 8, 2013, (now U.S. Patent Application Publication No. 2014-0257925), U.S. patent application Ser. No. 13/791,691 entitled "Demand Forecasting Systems and Methods Utilizing Fare Adjustment" filed on Mar. 8, 2013, (now U.S. Patent Application Publication No. 2014-0257881) and U.S. patent application Ser. No. 13/791,711 entitled "Demand Forecasting Systems and Methods Utilizing Prime Class Remapping" filed on Mar. 8, 2013, (now U.S. Patent Application Publication No. 2014-0257882), each of which are incorporated herein by reference in their entirety.

Principles and features of the present disclosure may also suitably be combined with principles of reserve forecasting, for example as disclosed in U.S. patent application Ser. No. 13/793,049 entitled "Reserve Forecasting Systems and Methods" filed on Mar. 11, 2013, (now U.S. Patent Application Publication No. 2014-0257900), which is incorporated herein by reference in its entirety.

While the present disclosure may be described in terms of an airport, an aircraft, a gate, a runway, and so forth, one skilled in the art can appreciate that similar features and principles may be applied to other transportation systems and vehicles such as, for example, buses, trains, ships, trucks, automobiles, and/or the like.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to utilize such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A computer-implemented method comprising:

registering, by a computer, a plurality of aircraft in a simulation;

scheduling, by the computer, an event with gate node business rules, wherein the event includes a first aircraft occupying a node, in response to calling up the event, wherein the gate node business rules are associated with a suggested gate pushback time; and wherein the suggested gate pushback time is based on a departing runway minimum queue size;

modeling, by the computer, a taxi procedure for the first aircraft based on gate node business rules;

repeatedly executing, by the computer, a graph network model using characteristics of a first pushback zone of a plurality of pushback zones, to obtain a suggested gate pushback time for the first aircraft in the first pushback zone, wherein the first pushback zone includes a pushback time distribution based on historical data;

repeatedly calculating, by the computer, the suggested gate pushback time for the plurality of aircraft in the first pushback zone to minimize overall taxi time for the plurality of aircraft, wherein the suggested gate pushback time is based upon a gate hold time of each aircraft in the plurality of aircraft in the first pushback zone that does not exceed a gate hold time threshold established by the gate hold business rules; and communicating, by the computer and to an air traffic controller, a request for at least one of a ground stop program or a ground delay program in the first pushback zone, responsive to the suggested gate pushback time, wherein the first aircraft is pushed back from an associated airport gate, responsive to the suggested gate pushback time in the first pushback zone.

2. The method of claim 1, further comprising allowing, by the computer, the first aircraft of the plurality of aircraft at an airport to occupy the node on a ground link, in response to the first aircraft approaching the node, a next ground link having available capacity and the node not being occupied by a second aircraft.

3. The method of claim 2, further comprising triggering, by the computer and in response to a PassNode event being scheduled including the second aircraft waiting on the last ground link, movement of the second aircraft forward for waiting on the next ground link as more space is made available on the next ground link.

4. The method of claim 1, further comprising releasing, by the computer and in response to a LeaveNodeArea event being scheduled, the node of a currently occupying aircraft.

5. The method of claim 2, further comprising creating, by the computer and in response to the second aircraft waiting for the node, a EnterNodeArea trigger to enter the node for the second aircraft.

6. The method of claim 1, further comprising triggering, by the computer and after a take-off event, another take-off event in response to the first aircraft waiting on a runway entrance node and no blockage is applied.

7. The method of claim 1, further comprising scheduling, by the computer, multiple times for the first aircraft to pass the runway entrance node to model a runway crossing for the first aircraft in a graph network model.

8. The method of claim 1, further comprising:

assessing, by the computer, connection information associated with an item of luggage associated with the first aircraft; and repeatedly executing, by the computer, the graph network model to obtain a suggested gate pushback time for the first aircraft based on the assessing of the connection information.

9. The method of claim 1, further comprising calibrating, by the computer, a parameter of the graph network model utilizing historical aircraft flight information for the airport.

10. The method of claim 1, further comprising associating, by the computer, the gate node business rules to at least one of a sequence of events, state transitions or the first aircraft in the graph network model.

11. The method of claim 1, wherein the gate node business rules utilize real-time characteristics of the airport, wherein the real-time characteristics include rates and configuration to drive simulation parameters, and wherein the gate node business rules are associated with aircraft path, taxi speed and runway procedures.

12. The method of claim 9, wherein the calibrating comprises revising, by the computer and in the graph network model, at least one of a speed zone distribution for the ground link or the gate node business rules associated with a state transition.

13. The method of claim 1, further comprising creating, by the computer, the graph network model representing the airport, wherein the graph network model comprises a plurality of nodes and a plurality of links, wherein the plurality of nodes includes a gate node, airlinks, the runway entrance node and an exit node, and the runway crossing with a crossing node and ground links, and wherein the graph network model is a directed graph.

14. The method of claim 1, further comprising:

calibrating, by the computer, a parameter of the graph network model utilizing historical aircraft flight information for the airport; and creating, by the computer, calibrated parameters based on different operating characteristics of the airport.

15. The method of claim 1, further comprising:

calculating, by the computer, a time for the first aircraft to pass a ground link distance that is retrieved from historical speed table business rules for the ground link;

removing, by the computer, the first aircraft from a last ground link; and adding, by the computer, the first aircraft to the next ground link.

16. The method of claim 1, further comprising implementing, by the computer, business rules for checking runway blockage by arrivals or crossings.

17. The method of claim 1, further comprising:

calculating, by the computer, taxi path and taxi time for each of the plurality of aircraft; determining, by the computer, ground congestion at the airport; and resolving, by the computer and using a business rules engine, taxi conflicts and gate conflicts among the plurality of aircraft to model ground traffic at the airport.

18. The method of claim 17, wherein the resolving comprises determining, by the computer, a departure sequence for the plurality of aircraft, wherein the departure sequence is configured to minimize overall taxi time for the plurality of aircraft.

19. The method of claim 1, further comprising checking, by the computer, potential future directional head-to-head aircraft conflicts with the second aircraft to avoid gridlock.

20. A system comprising:

one or more processors; and one or more tangible, non-transitory memories configured to communicate with the one or more processors, the tangible, non-transitory one or more memories having instructions stored thereon that, in response to execution by the one or more processors, cause the one or more processors to perform operations comprising:

registering, by the one or more processors, a plurality of aircraft in a simulation;

scheduling, by the one or more processors, an event with gate node business rules, wherein the event includes a first aircraft occupying a node, in response to calling up the event, wherein the gate node business rules are associated with a suggested gate pushback time; and wherein the suggested gate pushback time is based on a departing runway minimum queue size;

modeling, by the one or more processors, a taxi procedure for the first aircraft based on gate node business rules;

repeatedly executing, by the one or more processors, a graph network model using characteristics of a first pushback zone of a plurality of pushback zones, to obtain a suggested gate pushback time for the first aircraft in the first pushback zone, wherein the first pushback zone includes a pushback time distribution based on historical data;

repeatedly calculating, by the one or more processors, the suggested gate pushback time for the plurality of aircraft in the first pushback zone to minimize overall taxi time for the plurality of aircraft, wherein the suggested gate pushback time is based upon a gate hold time of each aircraft in the plurality of aircraft in the first pushback zone that does not exceed a gate hold time threshold established by the gate hold business rules; and communicating, by the one or more processors and to an air traffic controller, a request for at least one of a ground stop program or a ground delay program in the first pushback zone, responsive to the suggested gate pushback time, wherein the first aircraft is pushed back from an associated airport gate, responsive to the suggested gate pushback time in the first pushback zone.

* * * * *